G. B. Brayton,
Steam-Boiler Water-Feeder,
№ 44,599. Patented Oct. 11, 1864.
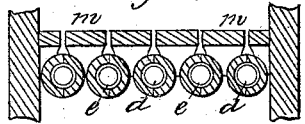
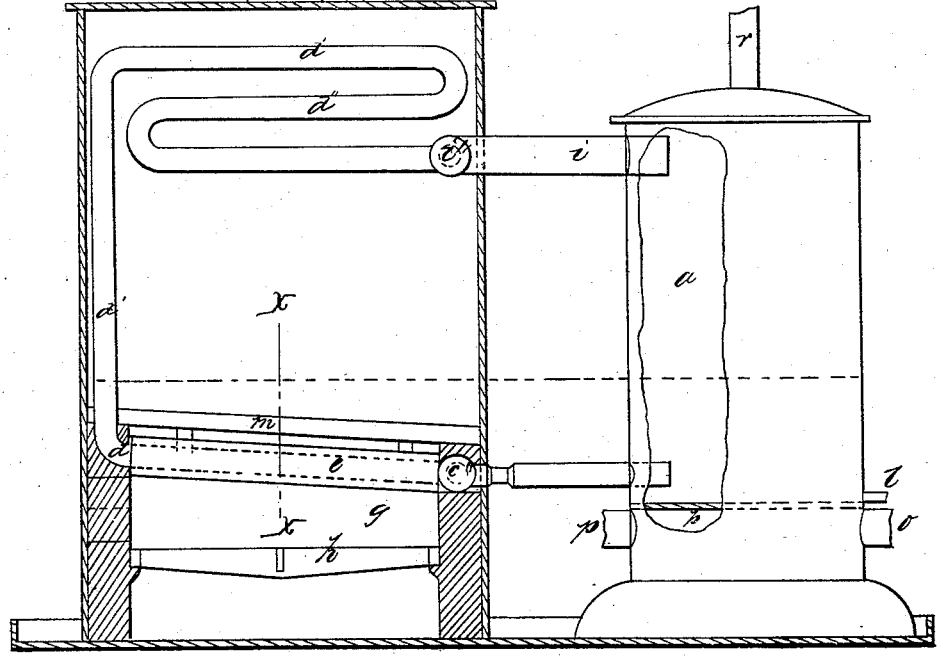

UNITED STATES PATENT OFFICE.

GEORGE B. BRAYTON, OF PROVIDENCE, RHODE ISLAND.

IMPROVEMENT IN STEAM-GENERATORS.

Specification forming part of Letters Patent No. 44,599, dated October 11, 1864.

*To all whom it may concern:*

Be it known that I, GEORGE B. BRAYTON, of the city and county of Providence, in the State of Rhode Island, have invented certain new and useful Improvements in steam-generating apparatus, which results in giving perfect safety from the dangerous and damaging effects of explosions, thus dispensing with that constant attention heretofore rendered necessary in the production of steam, economy in the consumption of fuel, and economy in construction, as compared with the ordinary forms of steam-generating apparatus.

These new and valuable results are obtained through a series of inventions fully described in this and other Letters Patent granted to me and bearing even date with this, each and all of which inventions may be used independently of each other, and are therefore made the subject of separate patents. Each specification is descriptive of only so much of the accompanying drawing as is necessary to understand fully the particular improvement under discussion; but the different specifications, when taken in connection, make a complete description of the whole apparatus.

The following specification has relation to one of those improvements, and is termed a "feed-water heater" in combination with a steam and water vessel in a steam-generating apparatus; and the following is a full, clear, and exact description of the same, reference being had to the accompanying drawing.

$a$ is a closed vessel to contain water and steam. It receives its supply of water near its bottom through the pipe $l$, and supplies water to a steam-generator through the pipe $c$, placed at a point higher up. The purpose and operation of this vessel are fully explained in my patent for a safety supplemental steam and water vessel, bearing even date with this.

A closed vessel, $b$, is connected with the bottom of the vessel $a$, and acts as a receiver of exhaust-steam from an engine.

In the apparatus represented in the drawing I have extended the sides of the vessel $a$ down to the bottom of the vessel $b$, thus making the sides of the two vessels of one piece.

The operation of this apparatus is as follows: Water is admitted through the pipe $l$ by pressure from a pump or other equivalent means, and flows over the upper surface of the bottom of the vessel $a$. Exhaust-steam from an engine is admitted into the vessel $b$ through the pipe $o$, and comes into contact with the under surface of the vessel $a$, and transmits heat to the water on the upper surface, thus heating the water before it passes to a generator by the pipe $c$. The pipe $c$ is placed at some distance above the bottom of the vessel $a$, to allow the water admitted through the pipe $l$ to become properly heated before passing off to a generator through the pipe $c$.

An outlet for the steam to escape from the vessel $b$ is provided by the pipe $p$ to open to the atmosphere.

By this combination of a feed-water heater with a steam and water vessel in a steam-generating apparatus I am enabled to economize in construction as to cost and space to be occupied.

Having thus fully described my invention, I would state my claims as follows:

1. In combination with a steam-generator, the employment of a vessel, substantially as described, operating as a steam-drum and feed-water reservoir, substantially as shown and described.

2. In combination with the above, forming an exhaust-steam chamber under the body of the feed-water, so that it shall be heated both from above and from below, substantially as set forth.

GEO. B. BRAYTON.

Witnesses:
A. G. UTLEY,
ROBERT E. NORTHAM.